8701X
J. BAKER.
Car Wheel.
Patented Mar. 20, 1835.
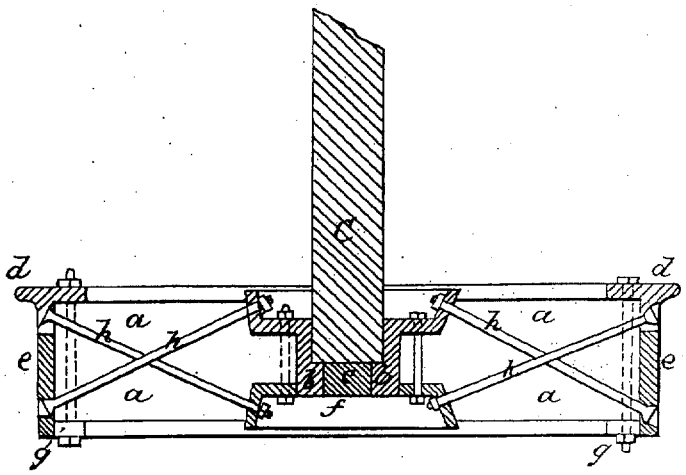
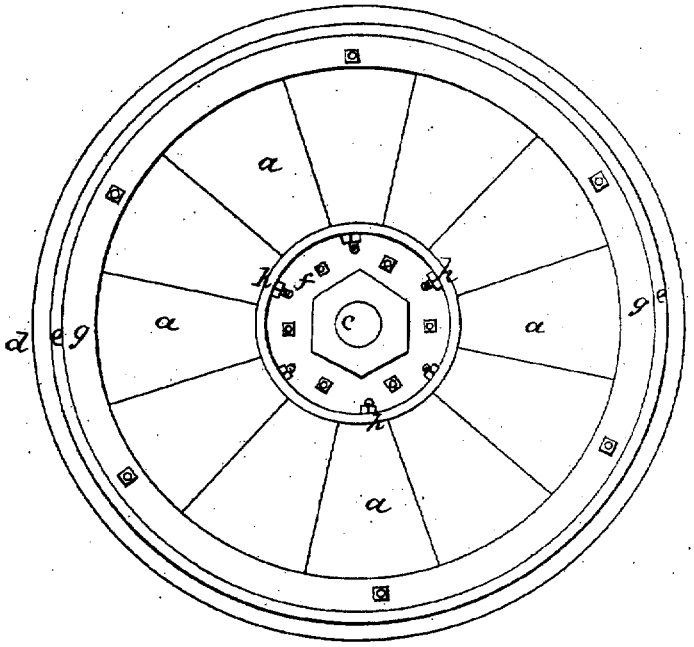
AM. PHOTO-LITHO. CO. N.Y. (OSBORNE'S PROCESS.)

John Baker of the City of Lancaster in the county of Lancaster
and State of Pennsylvania [illegible]

Letters Patent

The Schedule referred to in these Letters Patent and making
part of the same, containing a description in the words of the said
John Baker himself of his improvement in the Manufacture of
Wheels for Railroad cars -

Be it Known, that I. John Baker
of the City of Lancaster, in the county of Lancaster and state of Pennsyl-
vania have invented certain new and useful improvements in the man-
ner of constructing wheels for rail road cars which I designate by the
name of Baker's Car Wheels ~

The body of the wheel to be made of wedge formed timbers with
the grain of the wood extending from the hub or nave to the inner -
surface of the tire; the size and number of these pieces may be varied
in proportion to the diameter of the wheel, the smaller ends of these
wedges rest upon square surfaces on the nave enclosed on each side
by the hub plates, the outer ends of them supporting the tire and are
encased on each side with circular iron plates with bolts extending
from one plate to the other - These timbers may be composed if re-
quired of two layers which when clamped together in the manner des-
cribed with their joints alternating with each other; constitute the
horizontal thickness of the wheel, the hub plates are also secured to -
gether by screw bolts passing thro' the inner end of the wedges, the tire
secured upon the wheel by screw bolts, having their heads counter sunk.
so as to form an even surface, with the outer surface of the tire - These
bolts reverse alternately to the outer and inner hub plates, where they
are secured by screw nuts passing through a rim upon the hub plates
projecting for that purpose. ~

The axle is let its full size into the hub for one half the distance
when it may be shouldered off or reduced as may be desired, the inner
circular plate as above described may if desired be cast in connection
with the flanch forming a portion of the tire extending from one half Drawing Made to one and an half inches across the tread of the wheel to which may be
fitted the wrought iron tire constituting the entire tread of the wheel, or
there may be a cast iron tire with the flanch and outer circular plate conn[illegible]
in the casting and secured in the same manner with bolts as before descri[illegible]
so that the tire may be formed entirely of cast or wrought iron or both combi[illegible]
the hub to be of cast or wrought iron with the inner hub plate, and may be
formed in a solid piece with it; the outer hub plate shifting upon the
hub so as to give a draft to the screw bolts confining these two plates
together; the inner hub plate may be strenghtened by angular pieces from
the body of the Hub and extending such distance up towards the outer
rim of the plate as may be required, the shifting hub plate rests upon
the hub on four six or eight squares so as to prevent its turning upon
the hub, the outer rim is let into the wood in squares in proportion
to the diameter of the wheel, the inner hub plates may be let into the
timbers in the same manner.

In testimony that the above is a true specification of my
said improvement as before described I have hereunto set my hand
this 11.th day of March A.D 1835. One Thousand Eight Hundre[illegible]
& Thirty five John Baker Witnesses
George Flake Jr
Isaac W. [illegible]

Regd.
[illegible]

T 686 [illegible]